United States Patent [19]

Massieon

[11] 3,972,570

[45] Aug. 3, 1976

[54] WEAR-RESISTANT COMPOSITE TRACK SHOE

[75] Inventor: Charles G. Massieon, Marquette Heights, Ill.

[73] Assignee: Caterpillar Tractor Co., Peoria, Ill.

[22] Filed: Apr. 17, 1975

[21] Appl. No.: 568,950

[52] U.S. Cl. .................................. 305/54; 305/38
[51] Int. Cl.² ..................................... B62D 55/28
[58] Field of Search ...................... 305/38, 39, 54

[56] References Cited
UNITED STATES PATENTS

| | | | |
|---|---|---|---|
| 2,874,005 | 2/1959 | Engstrom | 305/54 |
| 3,071,417 | 1/1963 | Militana | 305/54 |
| 3,089,021 | 5/1963 | Hawes | 219/104 |
| 3,558,198 | 1/1971 | Tomita | 305/54 |

*Primary Examiner*—M. H. Wood, Jr.
*Assistant Examiner*—John A. Carroll
*Attorney, Agent, or Firm*—Wegner, Stellman, McCord, Wiles & Wood

[57] ABSTRACT

In a track-type vehicle, a high wear-resistant insert is bonded into a groove in the contact face of a grouser bar of a track shoe so as to extend the useful life of the grouser. The grouser bar may be integrally formed on the track shoe or may be a separate part welded to a base plate to form a composite track shoe. The material of the grouser bar may be somewhat ductile so as to support the relatively hard and brittle wear-resistant insert in the contact face of the grouser so as to produce a long life track shoe.

7 Claims, 5 Drawing Figures

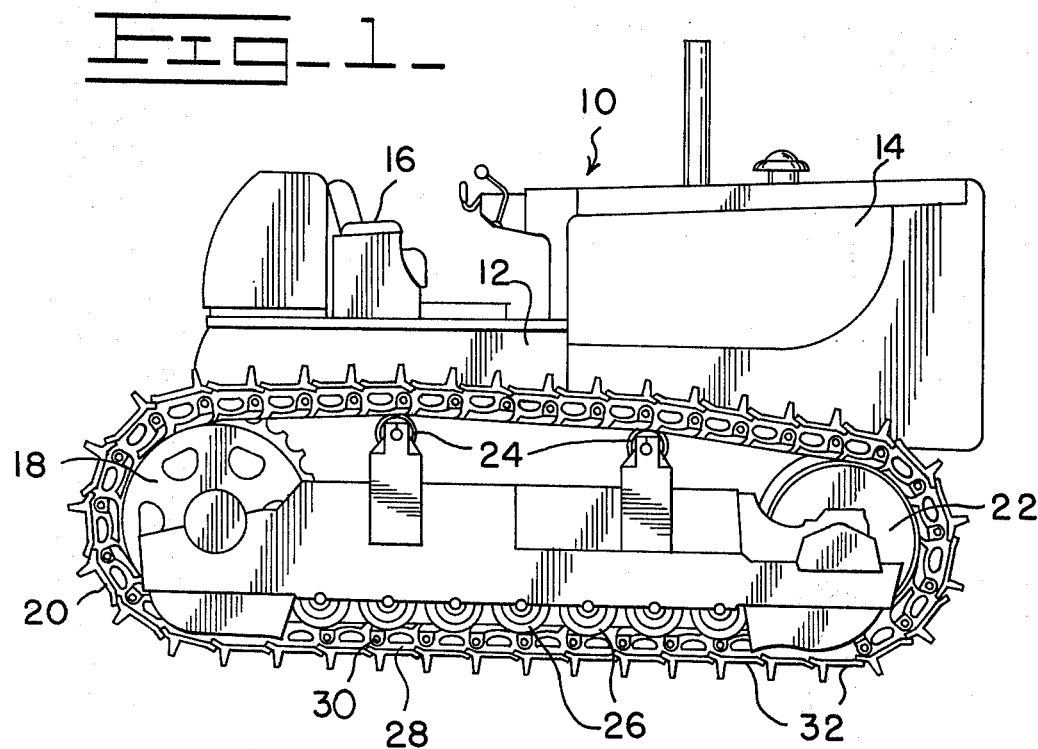
Fig_1_
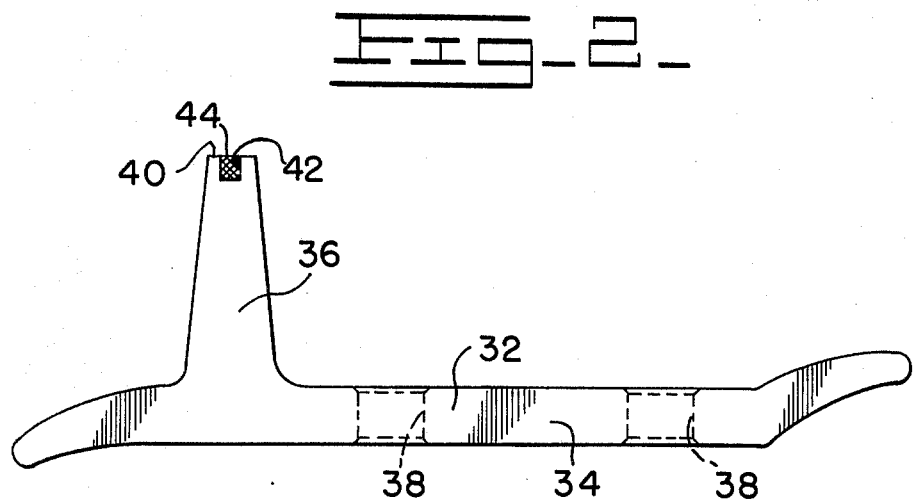
Fig_2_

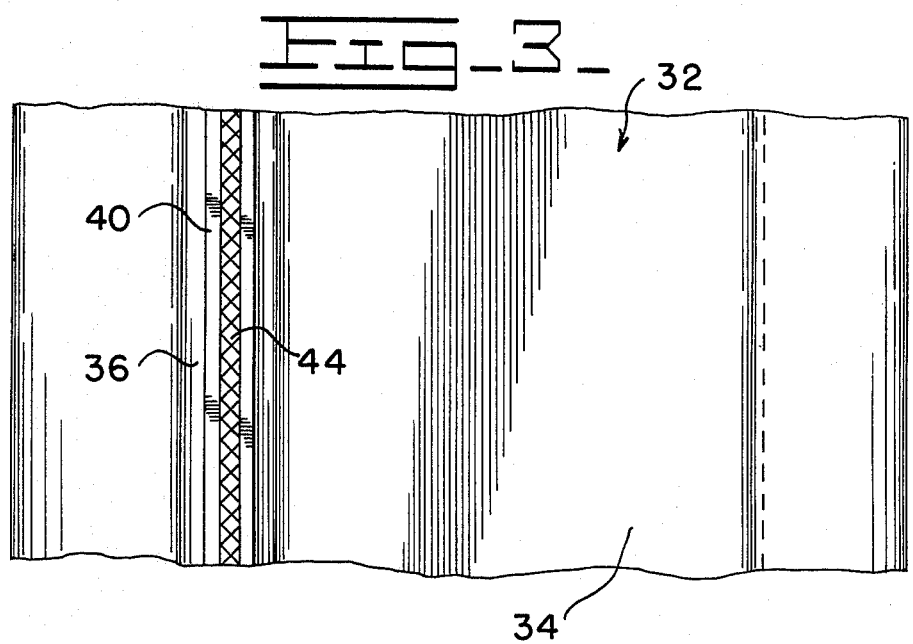
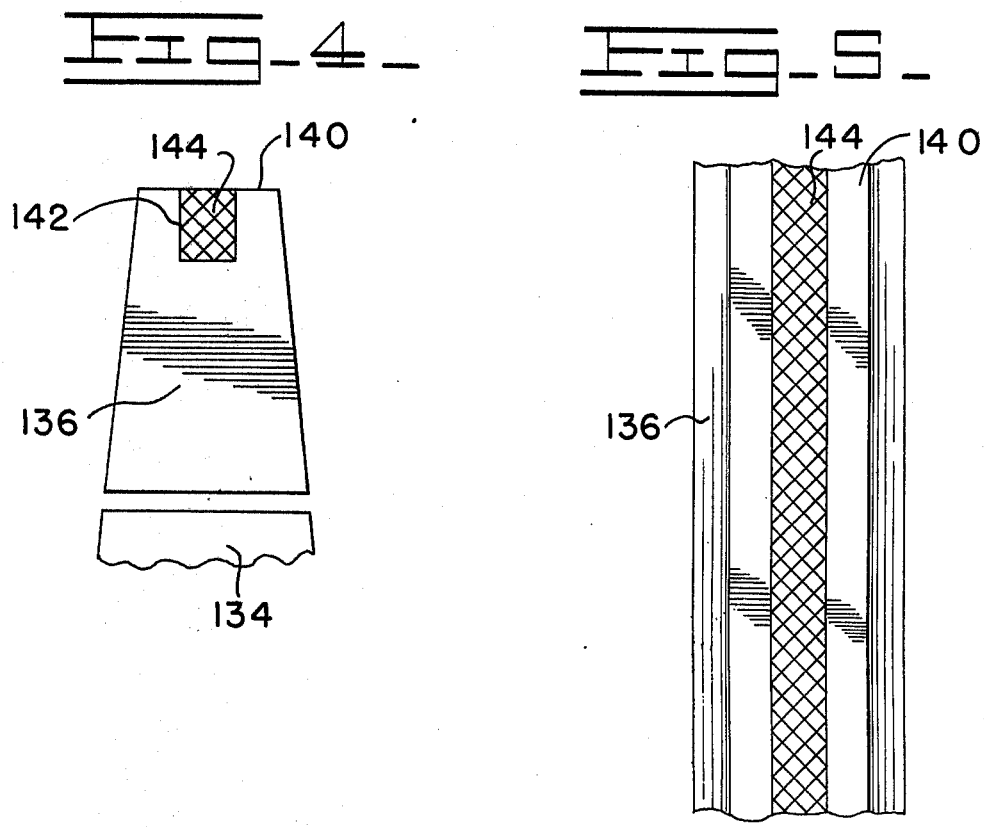

WEAR-RESISTANT COMPOSITE TRACK SHOE

BACKGROUND OF THE INVENTION

1. Field of the Invention

This invention relates to track-type vehicles and, more particularly, to improved tips for the grouser bars of the track shoes which tips have long-wear characteristics.

2. Description of the Prior Art

In track-type vehicles, such as crawler-type tractors, and the like, wear on the grouser bars of the track shoes has long been a problem. The problem and one solution thereto was set forth in U.S. Pat. No. 3,089,021 in the names of David H. Hawes and T. H. Spencer and assigned to the common assignee of the present application. In U.S. Pat. No. 3,089,021, wear-resistant grouser bars are electrically resistance pressure welded to a track shoe base made of a ductile and machinable material. The resulting track shoe was both cheaper than previous one-piece wear-resistant track shoes and extended the wear life of the track shoes considerably. However, it is desirable to further reduce the cost of the track shoe while further extending the wear life.

Attempts have been made to extend the wear-life of blades, or teeth for digging tools or graders and the like, by corrugating the edges of the teeth (see U.S. Pat. No. 3,286,379 to Benetti) or by setting wear-resistant material in a slot in the edge of the blade (see U.S. Pat. No. 3,529,677 to Stephenson) but the results of these efforts were never successful enough to be carried over into track shoes for use on track-type vehicles.

SUMMARY OF THE INVENTION

Track shoes for track-type vehicles should ideally be reasonably ductile and machinable so that the necessary machining can be performed thereon to adapt the shoe for attachment and use on the track of the vehicle. At the same time, the tip of the grouser bar on the track shoe should be hard and have a high-wear resistance. By milling or machining a groove or slot the width of the grouser bar and brazing an insert or strip of composite hard wear-resistant alloy in said slot, an improved track shoe grouser bar is provided that is cheaper to manufacture and has longer wear life in use.

The material of the grouser bar is ductile and forms a support or backing for the hard and brittle composite wear-resistant alloy which results in longer wear life for the composite alloy without chipping or other deterioration of the composite material.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is a side elevational view of a crawler-type tractor employing the improved long-life track shoes thereon;

FIG. 2 is an enlarged side elevational view of a track shoe having the improved hard wear-resistant insert bonded in the grouser bar;

FIG. 3 is a top plane view of a portion of the track shoe of FIG. 2;

FIG. 4 is an enlarged separate grouser bar with a hard wear-resistant insert bonded therein; and, FIG. 5 is an enlarged plane view of the grouser bar of FIG. 4.

DESCRIPTION OF THE PREFERRED EMBODIMENT

Referring to the drawings, and in particular FIGS. 1 through 3 thereof, a crawler-type tractor 10 is shown in FIG. 1 which has a chassis 12 upon which is mounted an engine which is enclosed in a housing 14 with an operator station 16 in close proximity thereto. The engine is operatively connected to sprockets 18 which sprockets drive the tracks 20 around the idler rollers 22 with carrier rollers 24 and track rollers 26 supporting said track so that driving of the sprockets 18 will lay down the track and advance the crawler-type vehicle. It is to be understood that the present invention has application on tracks of any track-type vehicle and although the description will proceed with respect to the track being used on a crawler-type tractor, it is not intended that the invention be so limited.

The track 20 of the vehicle is made up of a plurality of interconnected, mating track links 28 and track pins 30 which form a complete loop about the sprocket 18 and idler rollers 22. Attached to each pair of side-by-side track links 28 is a track shoe 32. Each track shoe 32 is comprised of a track base plate 34 and a grouser bar 36 integrally formed with said base plate 34. The base plate 34 of each track shoe has a pair of openings 38 through which openings fastening means are extended to secure the track shoe to a pair of side-by-side links 28. It is highly desirable that the base plate 34 and grouser bar 36 be formed by a rolling operation in which the grouser material is displaced from the ingot being rolled to provide the track shoe base plate 34 with its attached grouser bar 36 projecting therefrom. The material from which the track shoe 32 is rolled, must be ductile and easily machinable so that drilling of the openings 38 in the base plate may be performed without needless complication. In use, it has been found that using ductile material for the base plate 34 of the track shoe 32 is most desirable since such material lends itself to less failures caused by cracking or breaking of the track shoe. A plain machinable carbon steel, designated as a modified SAE 1037, is well adapted for forming the track shoe base plate 34 and the grouser bar 36 in one piece. The SAE 1037 carbon steel contains Carbon 0.32 to 0.40 percent; Manganese 1.30 to 1.65 percent; Phosphorous 0.40 percent maximum; Sulphur 0.050 percent maximum, and Silicon 0.15 to 0.30 percent. After the track shoe base plate 34 and grouser bar 36 have been formed, the tip 40 of the grouser is milled or machined to provide an elongate continuous slot or groove 42 extending from one side of the grouser to the other. The shape of the slot or groove 42 may be square, rectangular, dovetailed, or the like.

An insert or strip 44 of a composite alloy material is formed of a size and shape to fit within the confines of the slot or groove 42 in the tip of the grouser bar 36. In the preferred form of the invention, it is contemplated that one of the wear-resistant composite alloys, disclosed and claimed in the copending application of Eugene L. Helton, Lowell J. Moen, Preston L. Gale, Robert C. Mueller, Walker L. Pierce, Jr. and Henry J. Vermillion, Jr. Ser. No. 466,142, entitled "Composite Wear-Resistant Alloy, and Tools From Same", which application is assigned to the common assignee of the present application, be used to make up the insert or strip 44. A high wear-resistant composite alloy is made up of hard particles of Boron, Chromium and Iron held together with a matrix of a different material from the particles. Typical examples of alloy compositions are: (1) 40% Chromium; 10% Boron; and 50% Iron (all by weight percent) or (2) 62.5% Chromium; 9% Boron; 1.8% Carbon; and the balance Iron. The compositions should be made into hard particles by splashing the molten alloy into a fluid as described in said application Ser. No. 466,142. The matrix material is chosen for its tough and ductile characteristics. A typical matrix material is AMI 790 containing by weight percent 0.03% Carbon; 3.50% Silicon; 1.50% Boron; 1.25% Iron and the balance (i.e. 94 percent) Nickel; which, when mixed and sintered with the hard particles, produces a composite of wear-resistant alloy that has unusually long life and long wear resistant characteristics. As an alternate to the composite alloy, the insert or strip may be made of a high strength alloy steel, such as tungsten carbide, which may be used as a solid insert or may be made into particles and mixed with a matrix of the type described above. The insert or strip 44 of high wear-resistant material is positioned in the slot or groove 42 in the grouser tip 40 and is brazed in place therein in a conventional fashion. After the insert or strip 44 of wear-resistant material has been brazed in place, it may be necessary to heat treat the finished track shoe 32 so as to regain the ductility of the material of the track base plate 34 and grouser bar 36.

With an improved track shoe 32 bolted to each pair of side-by-side track links 28, the tracks 20 of the crawler-type vehicle are provided with a hard wear-resistant characteristic that adds considerable life and extended service to the track before the shoes have to be repaired or replaced.

In the modification of the invention shown in FIGS. 4 and 5, a grouser bar 136 is illustrated as being separate from the base plate 134 of the track shoe which grouser bar is adapted to be welded, or otherwise secured, to the base plate of the track shoe, such as is shown and described in the above-identified Hawes et al. U.S. Pat. No. 3,089,021. The difference between the grouser bar 136 of the present invention and that of the U.S. Pat. No. 3,089,021 patent is that the whole grouser bar 136 need not be of the special high wear-resistant material as is described in said Hawes et al. U.S. Pat. No. 3,089,021 patent and, in fact, may be of the same relatively ductile material from which the base plate 134 of the track shoe is formed. The tip 140 of the grouser bar 136 is milled or machined the full width of the grouser to form a slot or groove 142 therein of an appropriate width and depth. A separate insert or strip 144 of high wear-resistant material is formed and is tailored to fit in the slot or groove 142 in the grouser. The insert or strip of high wear-resistant material is then brazed, or otherwise secured, in position. The track shoe may be made up initially by using a base plate with the grouser bar 136 welded thereto or the grouser bar 136 may be added as a replacement to a worn out grouser bar which has been removed from the base plate.

As was described with respect to FIGS. 1 through 3, the preferred material for the insert or strip 144 is a composite alloy of one of the types described in the above-identified copending application Ser. No. 466,142 entitled "Composite Wear-Resistant Alloy, and Tools From Same." A high wear-resistant alloy comprised of Boron, Chromium and Iron set in a matrix of brazing alloy is preferred. The high wear-resistant alloy, a composition of 40% Chromium, 10% Boron and 50% Iron, is mixed, melted and is dropped on a cool surface to form the spheroidal particles which are then coated, such as with a coating of Nickel, which coated particles are then mixed with the matrix alloy, such as a brazing alloy, and heated to sinter the particles in the matrix whereupon the insert or strip 144 of high wear-resistant composite alloy is produced.

The grouser 136 is electrically-resistance pressure welded to the track shoe base plate 134 by use of the method of forming a composite welded article described in the Hawes et al. U.S. Pat. No. 3,089,021. That is, the grouser and the base plate are placed in an electrical-resistance pressure welding fixture whereby an arc between the grouser 136 and the base plate 134 produces the requisite softening of the respective surfaces. After the arc has been maintained for a predetermined brief period of time, sufficient for softening and melting the appropriate portions of the grouser and base plate, the grouser and base plate are forced into contact with each other under substantial pressure to cause the molten material to be forced together to produce the intimate bond between the heated plastic material of the two portions. The completed track shoe is removed from the machine and after appropriate trimming, is now ready for installation on the track links of the crawler-type tractor.

It should be noted that the inserts or strips 44 and 144 in the grouser bars represent a relatively small area of the wear surface of the track shoe so as to minimize the cost of using the insert. That is, it has been found that the size of the insert need not be large to provide the desired long-life wear characteristics. In addition, the insert 44 or 144 is positioned in the grouser bar at a location where high ductility is not required so that the relatively brittle insert will not adversely affect the function and operation of the track shoe.

Due to the presence of the high wear-resistant composite alloy insert or strip 144 in the grouser tip, it has been found that the wear life of the track shoes has been materially extended and, since the grouser and base plate can both be made from the less expensive ductile materials with only the relatively small, more expensive insert or strip of wear-resistant composite alloy bonded therein, the net cost of the track shoe is substantially reduced.

What is claimed is:

1. In a track shoe for a track-type vehicle having a one-piece base plate and grouser bar integrally formed of a ductile material, a tip projecting outwardly from said grouser bar, an elongate continuous slot formed in the tip of said grouser bar, and an elongate continuous wear bar insert made of a composite alloy having high wear-resistant characteristics being bonded in said slot and presenting a long-life wear surface.

2. In a track shoe as claimed in claim 1 wherein said composite alloy is composed of high strength alloy steel.

3. In a track shoe as claimed in claim 1 wherein said composite alloy is composed of hard particles of material bonded into a more ductile matrix material.

4. In a track shoe as claimed in claim 2 wherein said hard particles of material are made up of chromium, boron, and iron bonded into a matrix of a brazing alloy.

5. In a track shoe as claimed in claim 2 wherein said hard particles of material are made up of tungsten carbide particles.

6. In a track shoe as claimed in claim 3 wherein said composite alloy comprises spheroidal boride particles in said matrix material.

7. In the track-type vehicle as claimed in claim 3 wherein said matrix material consists of a brazing alloy, an alloy steel, or an iron-carbon-nickel alloy.

* * * * *